(12) United States Patent
Nakajima et al.

(10) Patent No.: US 7,575,267 B2
(45) Date of Patent: Aug. 18, 2009

(54) METAL CLIP FOR VEHICLE ACCESSORY FIXATION AND STRUCTURE USING THE SAME

(75) Inventors: Takeshi Nakajima, Yokohama (JP); Naoki Umemura, Toyota (JP); Hisashi Suzuki, Toyota (JP); Seiji Yamamoto, Toyota (JP); Makoto Oguri, Nagoya (JP)

(73) Assignees: Piolax Inc., Kanagawa (JP); Kyowa Sangyo Co., Ltd., Aichi (JP); Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 11/666,491

(22) PCT Filed: Nov. 8, 2005

(86) PCT No.: PCT/JP2005/020462

§ 371 (c)(1),
(2), (4) Date: Mar. 3, 2008

(87) PCT Pub. No.: WO2006/051787

PCT Pub. Date: May 18, 2006

(65) Prior Publication Data

US 2008/0309115 A1     Dec. 18, 2008

(30) Foreign Application Priority Data

Nov. 9, 2004 (JP) ............................. 2004-324563

(51) Int. Cl.
*B60J 3/00* (2006.01)
(52) U.S. Cl. ..................................................... 296/97.9
(58) Field of Classification Search ................ 296/97.9, 296/214
See application file for complete search history.

(56) References Cited

U.S. PATENT DOCUMENTS 5,560,575 A     10/1996     Krysiak (Continued)

FOREIGN PATENT DOCUMENTS

JP          06-76706          10/1994

(Continued)

*Primary Examiner*—Joseph D Pape
(74) *Attorney, Agent, or Firm*—Smith, Gambrell & Russell, LLP

(57) ABSTRACT

A metal clip for vehicle accessory fixation and a vehicle accessory installation structure using the metal clip, capable of improving a yield ratio of a metal plate required to form the metal clip and capable of reliably performing temporary fixation of accessories to an interior member. A metal clip (10) for vehicle accessory fixation has first V-shaped tabs (33) that are bent into a substantially V shape as seen from a side, an end edge of each of which V-shaped tabs (33) is an installation section (34) for engaging with a base section (12) of an accessory, and in which an engagement section (36a) for engagement with an installation hole of a vehicle panel is provided in the middle of each tab; an extension section (37) extended in a folding line (32) direction from a valley bottom section (31) of the first V-shaped tabs (33); and second V-shaped tabs (38) that extend from both sides of the extension section (37) in the direction crossing the extension section (37), each of which second V-shaped tabs (38) is bent in a V shape with an extension section (37) as the valley bottom section (31), and whose end sections (38a) engage with holes (51) of an interior member (50) to temporarily fix the accessory.

8 Claims, 8 Drawing Sheets

U.S. PATENT DOCUMENTS

| | | | |
|---|---|---|---|
| 6,007,136 A * | 12/1999 | Zittwitz et al. | 296/97.9 |
| 2004/0004368 A1 * | 1/2004 | Davey et al. | 296/97.9 |

FOREIGN PATENT DOCUMENTS

| | | |
|---|---|---|
| JP | 2003-247219 | 9/2003 |
| JP | 2004-42701 | 2/2004 |
| JP | 2004-155234 | 6/2004 |

\* cited by examiner

[Fig. 1]
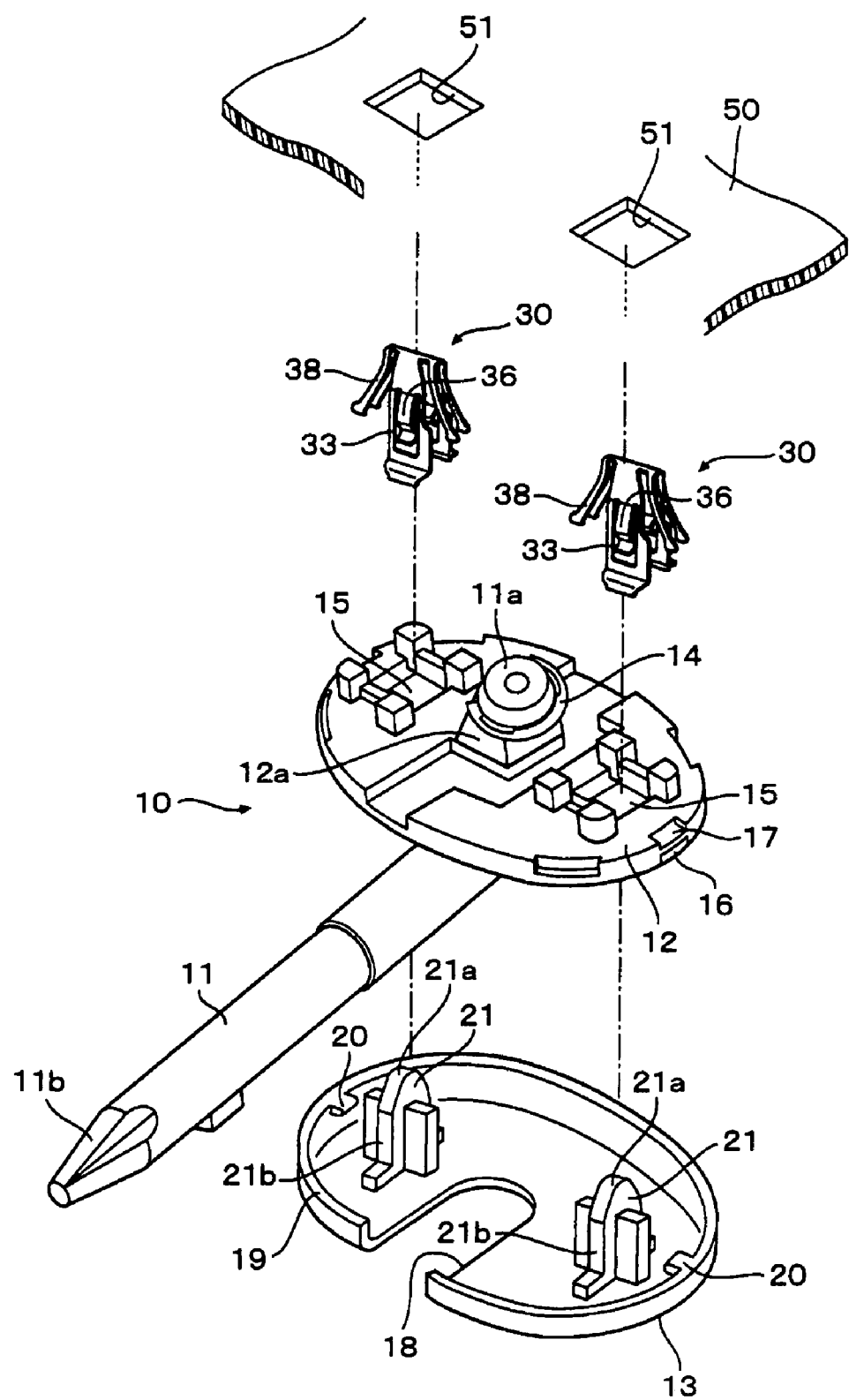

[Fig. 2]
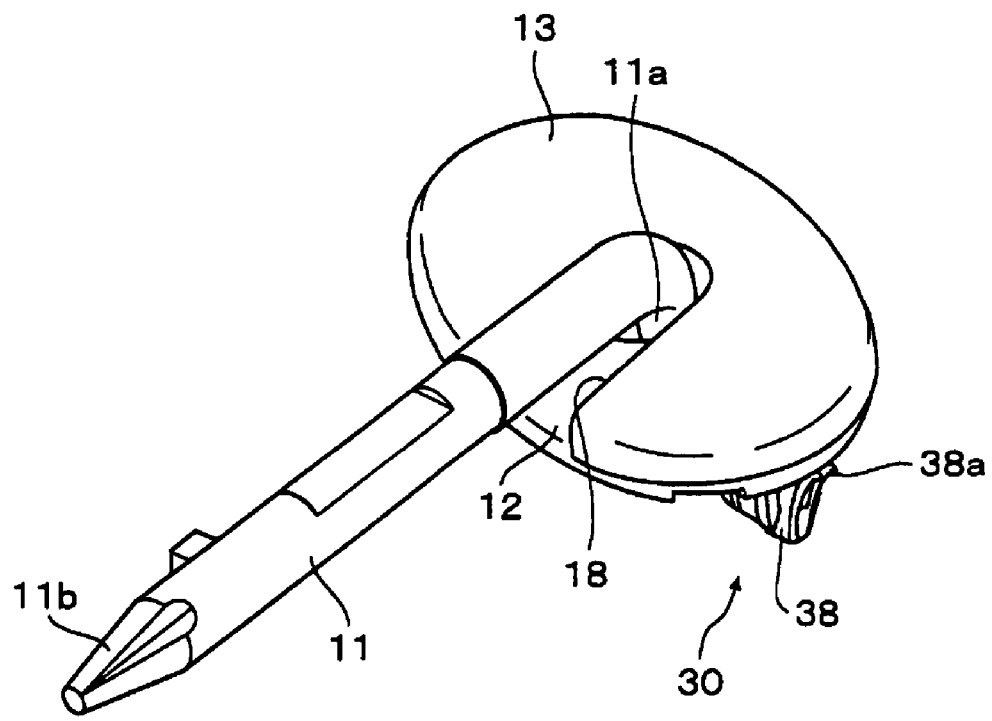

[Fig. 3]
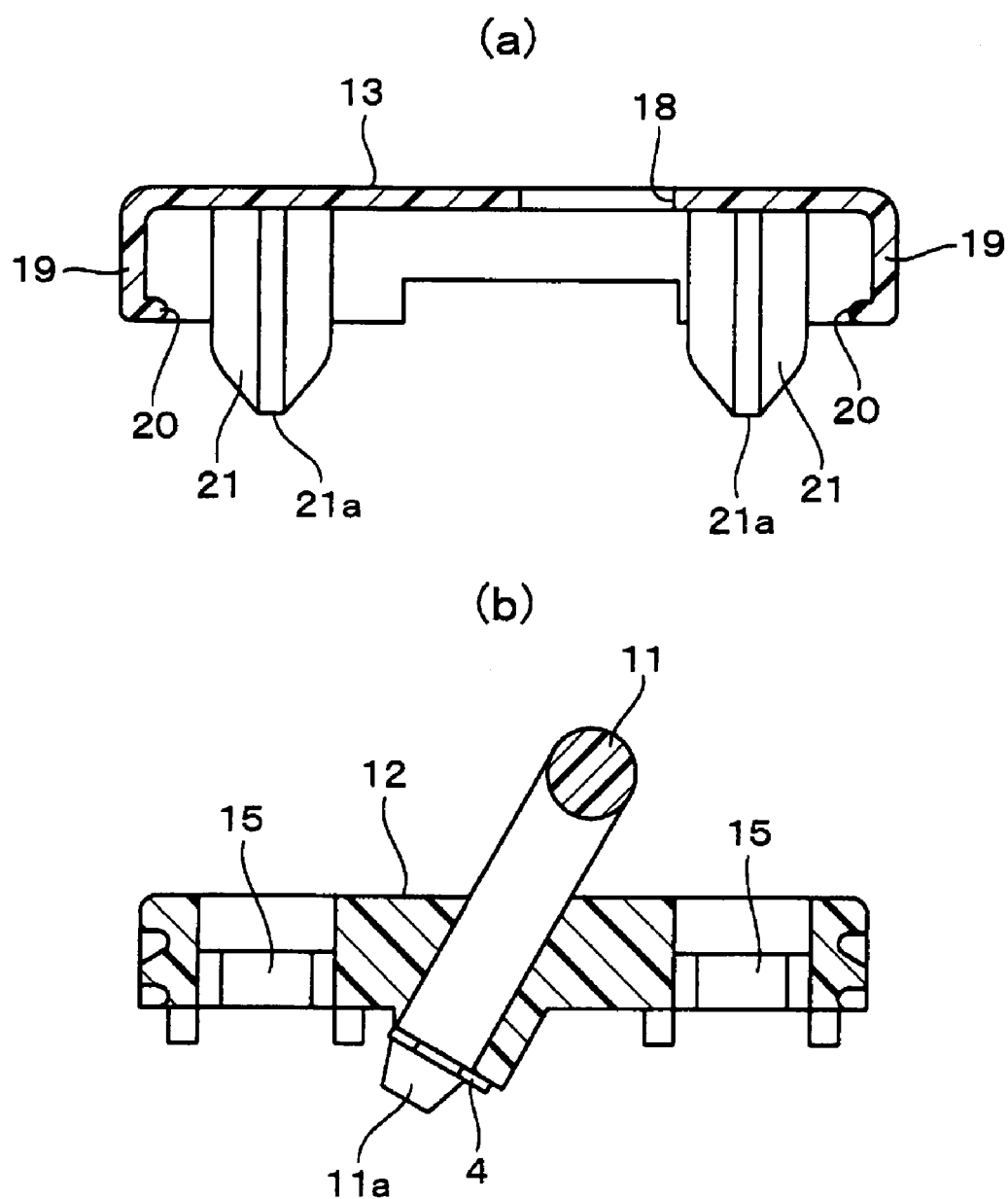

[Fig. 4]
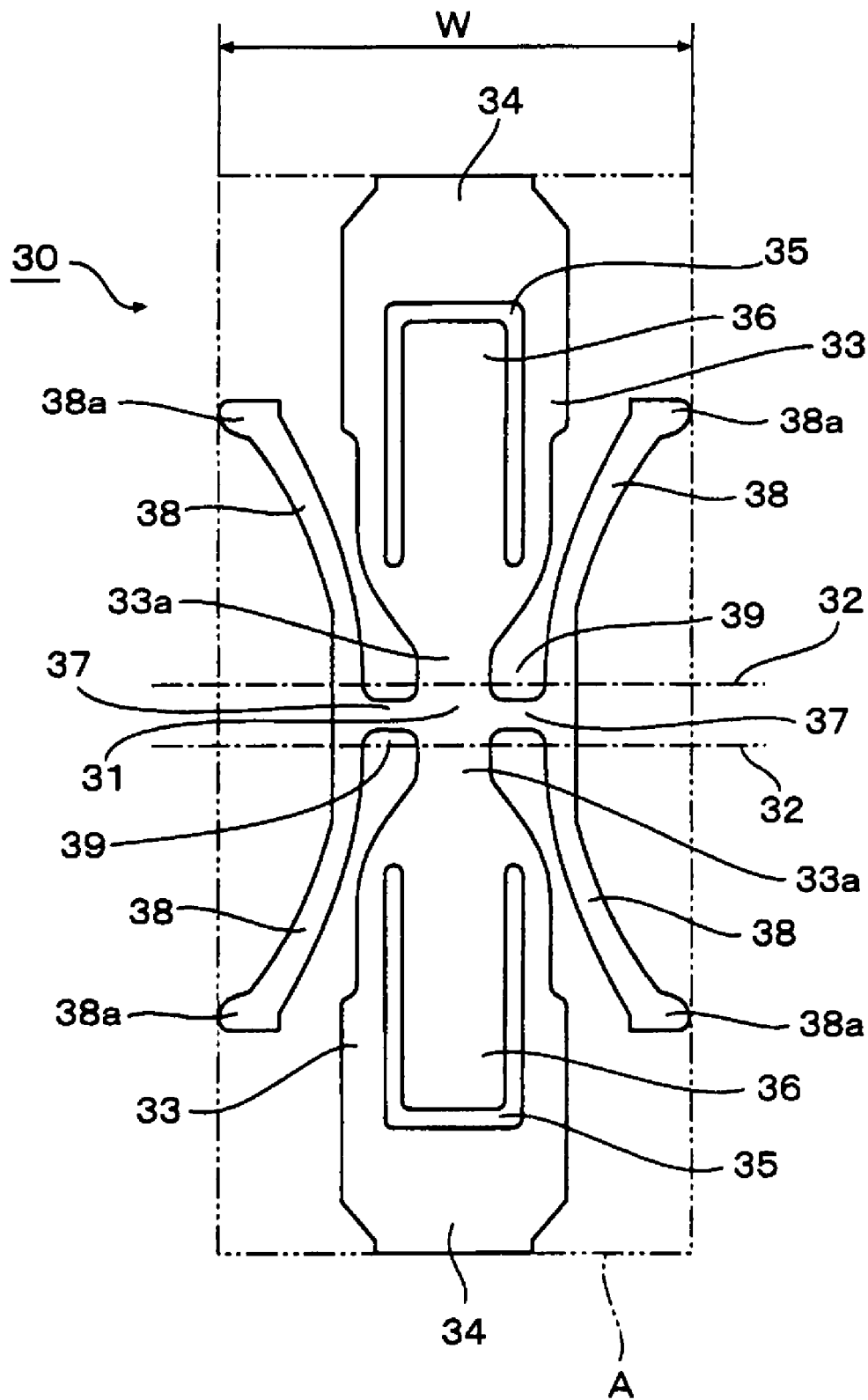

[Fig. 5]
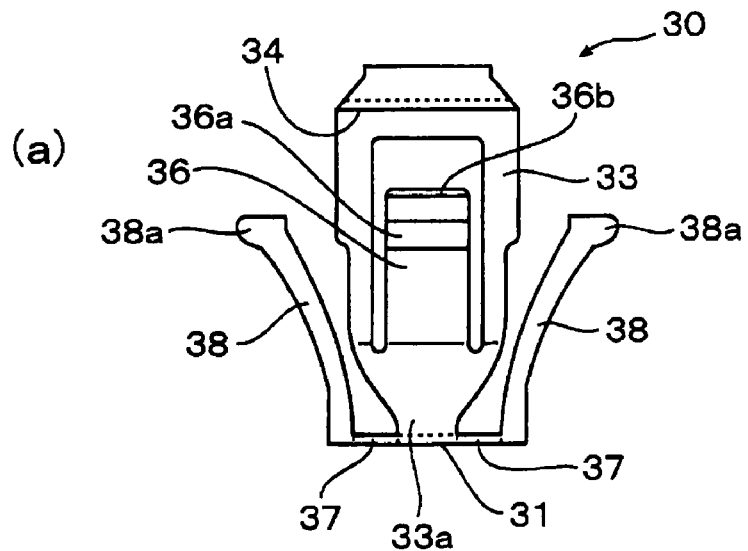
(a)
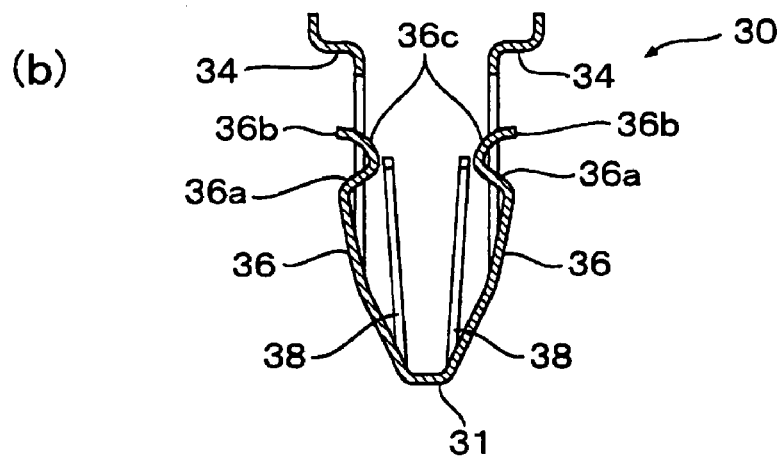
(b)
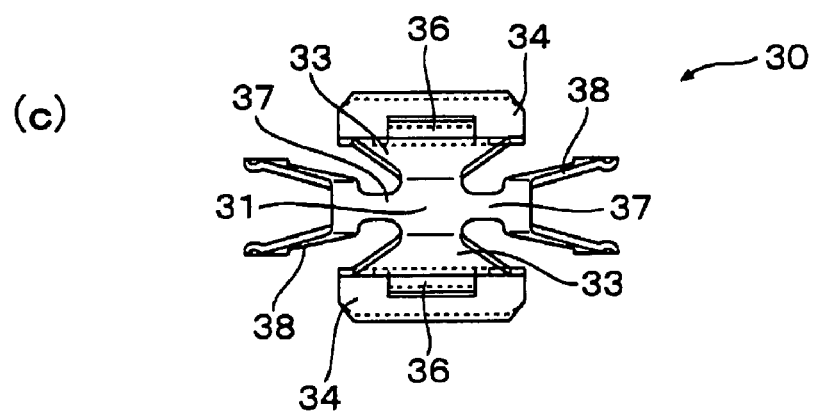
(c)

[Fig. 6]
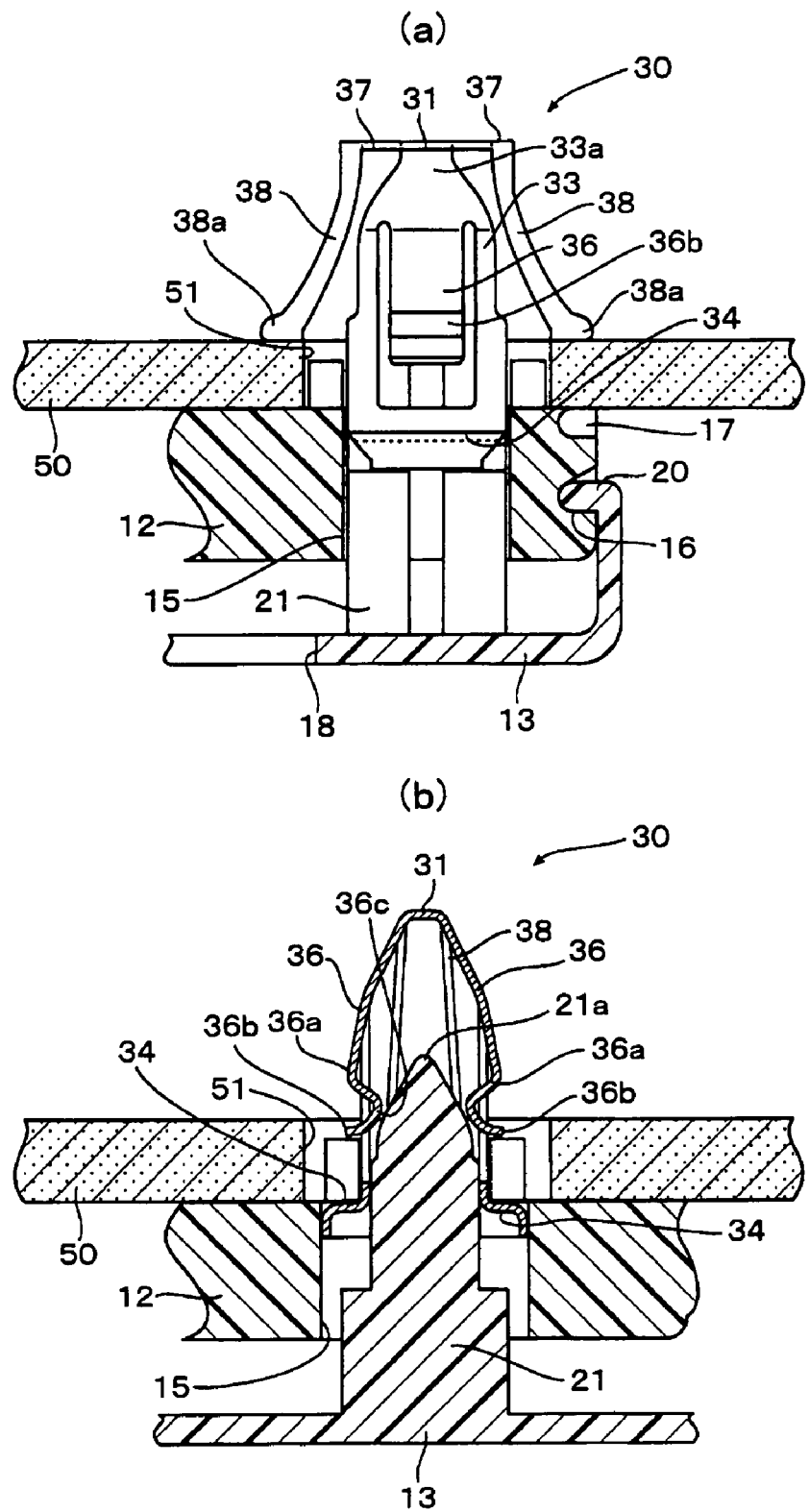

[Fig. 7]
(a)
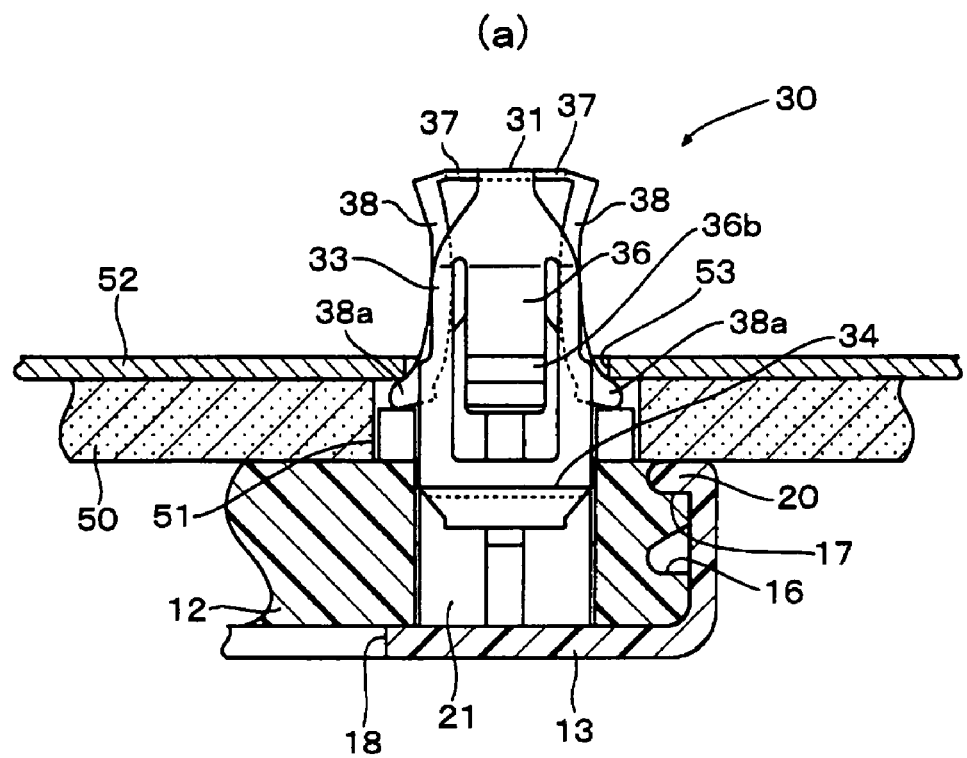
(b)
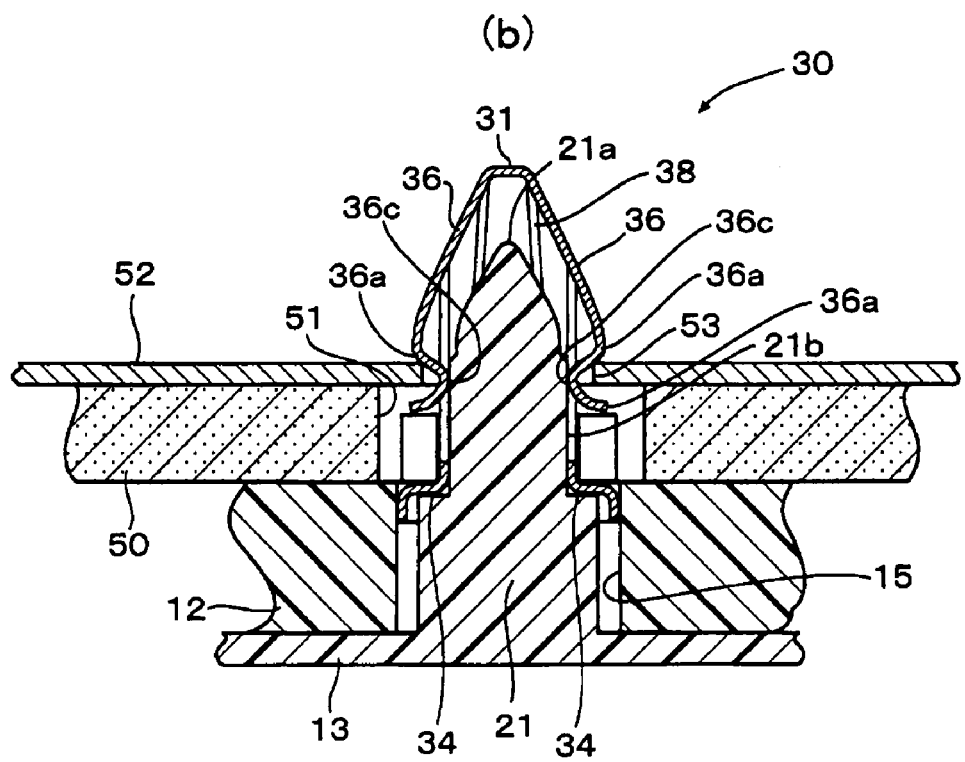

[Fig. 8]
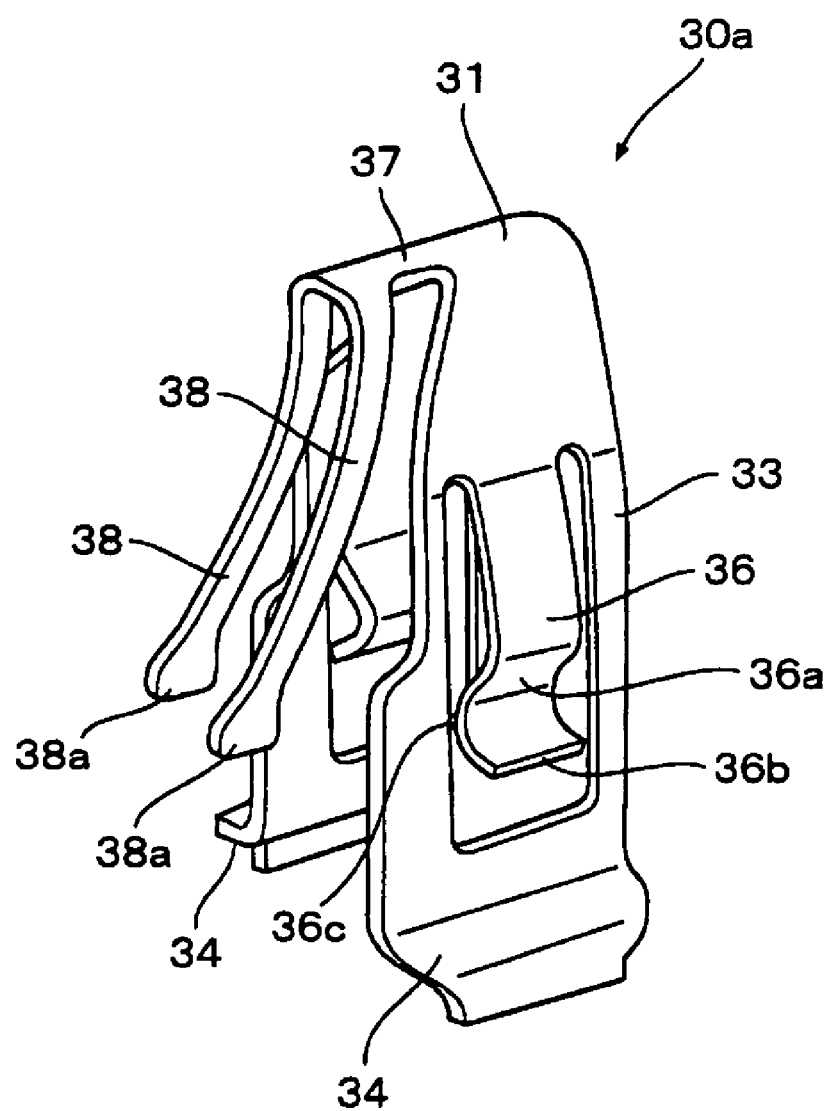

METAL CLIP FOR VEHICLE ACCESSORY FIXATION AND STRUCTURE USING THE SAME

TECHNICAL FIELD

The present invention relates to: a metal clip for vehicle accessory fixation, which is used to fix a vehicle accessory such as an assist grip or a sun visor to a vehicle panel through the intermediation of an interior member; and to a vehicle accessory installation structure using the same.

BACKGROUND ART

Vehicle accessories such as an assist grip and a sun visor are installed in the interior of an automobile. An assist grip is installed in the interior of a vehicle, for example, in the following manner. The interior member is put in through a front windshield opening, and is arranged on the vehicle panel, in which a hole in the vehicle panel and a hole in the interior member are aligned with each other. Further, a metal clip is assembled to the assist grip in advance. Then, the metal clip assembled to the assist grip is inserted into the hole of the vehicle panel as well as the hole of the interior member and engages with the inner periphery of the holes by the resilient force of the metal clip, thereby installing the assist grip in the interior of the vehicle.

As an example in which an accessory is installed in the interior of a vehicle by thus using a metal clip, there is disclosed in Patent Document 1 mentioned below an installation structure for an assist grip which is mounted to a body panel by a clip in the interior of a vehicle and which can be pulled out for use from a position where the assist grip is accommodated; at both ends of the assist grip, there are formed connecting portions on which cap formed separately from the assist grip are put; at least one connecting portion is fixed to the body panel through the intermediation of the clip; each of the connecting portions is formed at an end of the assist grip integrally with the main body portion of the assist grip, and is composed of a thin-plate-like sliding portion having an elongated hole so as to allow displacement by a predetermined distance, a base member which is formed separately from the assist grip and which has an inner surface on which the sliding portion is slidably placed and in which there is formed a hole allowing insertion of the clip, and a pressurizing member formed separately from the assist grip and adapted to hold the sliding portion in a pressurized state; the sliding portion is held between the base member and the pressurizing member by the clip; the clip has a pair of leg portions which can be varied in the degree of opening through elastic deformation thereof, and an engagement section locked to the body panel so as not to be detached after the insertion; and they are inserted into three holes of the connecting portions, and are inserted into and fixed to a hole provided at the assist grip installation position of the body panel.

The above-mentioned installation method, in which the assist grip is installed after the arrangement of the interior member on the vehicle panel, involves many steps; further, an installing operation for the assist grip inside a small interior of the vehicle is required, where it is rather difficult to secure the space for the installing operation, resulting in a problem with workability.

In view of this, there is available a known structure in which the assist grip is temporarily fixed to the interior member in advance before effecting the final fixation thereof. For example, Patent Document 2 mentioned below discloses a structure which has four thin resilient spring fingers in total extending from the sides of the lower distal ends of two resilient legs back toward the head liner, situated on the depth side of a head liner and a vehicle body metal plate when they are in a temporarily assembled state, thereby making it possible to effect temporary assembly of the assist grip to the head liner by virtue of those four thin resilient spring fingers.

Further, Patent Document 3 mentioned below discloses a structure in which an accessory to be mounted to a roof panel has a clip member and a temporary fixation boss and in which the temporary fixation boss of the accessory is inserted into a mounting hole of the roof trim from the front side thereof, while a push-on fixer being inserted into the temporary fixation boss from the back side of the roof trim, thereby effecting temporary fixation; in this state, the clip member of the accessory is inserted into the mounting hole of the roof panel, whereby the accessory is mounted to the roof panel.

Patent Document 1: JP 2004-155234 A
Patent Document 2: U.S. Pat. No. 5,560,575
Patent Document 3: JP 2004-42701 A

DISCLOSURE OF THE INVENTION

Problems to be solved by the Invention

Of various vehicle accessories, an assist grip, which is to be grasped by hand, is preferably formed of metal, as in the case of the metal clip of Patent Document 1 mentioned above, since a large load is applied thereto. Thus, it is desirable for the member that can be temporarily assembled to the interior member in Patent Document 2 mentioned above to be formed of metal.

When a structure having four thin and narrow resilient spring fingers is to be formed of metal, as in the case of Patent Document 2 mentioned above, a metal plate is shaped through stamping, and then bending is performed thereon. However, when performing stamping on the structure of Patent Document 2 mentioned above, which has four thin and narrow resilient spring fingers, the thin and narrow resilient spring fingers developed in a plane will be radially spread to occupy a wastefully large space, resulting in poor yield rate of the metal plate of material.

In the case of Patent Document 3 mentioned above, temporary fixation of the accessory to the roof trim can not be achieved unless a member like a push-on fixer fixes the temporary fixation boss of the accessory from the back side of the roof trim, where a rather troublesome temporary fixing operation is involved.

It is therefore an object of the present invention to achieve: in a metal clip for vehicle accessory fixation enabling a vehicle accessory to be installed on a vehicle panel, an improvement in terms of the yield rate of the requisite metal plate when forming this metal clip; and a temporary fixation of the accessory reliably to an interior member.

Means for solving the Problems

To achieve the above-mentioned object, according to a first aspect of the present invention, there is provided a metal clip for vehicle accessory fixation to be mounted to a base section of a vehicle accessory and inserted into a hole of an interior member and thereby to effect temporary fixation of the accessory to the interior member, and to be inserted, in this state, into an installation hole of a vehicle panel and thereby to effect final fixation of the accessory to the vehicle panel. The metal clip includes: a first V-shaped tab bent into a substantially V-shape as seen from a side, the first V-shaped tab including an installation section to engage with the base section of the accessory, wherein the installation section is formed at ending edge of each flap of the first V-shaped tab and including an engagement section to engage with the installation hole of the vehicle panel, wherein the engagement section is provided at halfway portion of each flap of the first V-shaped tab; an extension section extending in a direction along folding line from a valley bottom section of the first V-shaped tab; and a second V-shaped tab extending from both sides of the extension section in directions crossing the extension section and bent into a V-shape with the extension section as a valley bottom section, the second V-shaped tab including end sections thereof to engage with the hole of the interior member and thereby to effect temporary fixation of the accessory.

According to the aspect as described above, the first V-shaped tab for final fixation to engage with the installation hole of the vehicle panel is formed to extend on both sides from the valley bottom section of the first V-shaped tab as a center while the second V-shaped tab for temporary fixation to engage with the hole of the interior member is formed to extend on both sides from the extension section extended in the direction along folding line as a center, therefore the area of the metal clip when in the developed state is relatively small, thus making it possible to achieve an improvement in terms of the yield rate in a metal plate when stamping is performed thereon.

Further, the distance from the second V-shaped tab to the first V-shaped tab is substantially determined by the shape attained at the time of stamping, so it is possible to prevent the position of the end section of the second V-shaped tab from being unreliable, which is otherwise varied depending upon the bending angle of the metal plate.

Moreover, the end section of the second V-shaped tab engages with the hole of the interior member, whereby it is possible to temporarily fix the accessory to the interior member by the metal clip alone, therefore there is no need to provide a member like a push-on fixer as in the case of Patent Document 3 mentioned above, thereby achieving an improvement in terms of workability.

According to a second aspect of the present invention, in the first aspect of the invention, there is provided a metal clip for vehicle accessory fixation in which each flap of the first V-shaped tab is connected to the extension section with the width thereof reduced.

According to the aspect as described above, the length of the extension section extended from the valley bottom section of the first V-shaped tab in the direction along folding line can be made as large as possible, therefore, when the second V-shaped tab is inserted into the hole of the interior member and the installation hole of the vehicle panel, the second V-shaped tab can be easily deflected around the extension section.

According to a third aspect of the present invention, in the first or second aspect of the invention, there is provided a metal clip for vehicle accessory fixation in which: a bending angle of the valley bottom section of the second V-shaped tab is smaller than a bending angle of the valley bottom section of the first V-shaped tab; and whereby, when the second V-shaped tab is deflected so that the extension section bends, the second V-shaped tab enters the inner side of the first V-shaped tab.

According to the aspect as described above, when the second V-shaped tab is deflected in a bending fashion, the second V-shaped tab can be deflected to a sufficient degree without coming into contact with the first V-shaped tab, so the second V-shaped tab can be easily inserted into the hole of the interior member as well as the installation hole of the vehicle panel.

According to a fourth aspect of the present invention, in any one of the first to third aspects of the invention, there is provided a metal clip for vehicle accessory fixation in which the second V-shaped tab crosses the extension section and is formed to extend obliquely away from the first V-shaped tab.

According to the aspect as described above, it is possible to make the second V-shaped tab stick outward by a large length hereby to reliably engage with the hole of the interior member; further, when the second V-shaped tab is inserted into the hole of the interior member as well as the installation hole of the vehicle panel, the second V-shaped tab can be easily deflected around the extension section.

According to a fifth aspect of the present invention, in the fourth aspect of the invention, there is provided a metal clip for vehicle accessory fixation in which the second V-shaped tab is formed curvedly so that the second V-shaped tab is largely inclined with respect to a vertical plane perpendicular to the extension section as the second V-shaped tab extending away from the extension section.

According to the aspect as described above, when the second V-shaped tab is inserted into the hole of the interior member and the installation hole of the vehicle panel, the deflection amount increases as the second V-shaped tab is inserted deeper, resulting in the increase in resistance; regardlessly, since the bending moment increases as the pressing point approaches the end section of the second V-shaped tab, the increase in insertion resistance is suppressed, thus facilitating the insertion.

According to a sixth aspect of the present invention, in any one of the first to fifth aspects of the invention, there is provided a metal clip for vehicle accessory fixation in which the end section of the second V-shaped tab is provided to abut the inner peripheral portion of the installation hole of the vehicle panel while the first V-shaped tab engaging with the installation hole of the vehicle panel.

According to the aspect as described above, in a state in which the first V-shaped tab engages with the installation hole of the vehicle panel thereby to effect final fixation, the second V-shaped tab in a contracted state abuts the inner peripheral portion of the installation hole, and does not engage with the back side of the installation hole; therefore, when the metal clip is necessitated to detach, it is possible to prevent the second V-shaped tab from engaging with the installation hole of the vehicle panel, thus avoiding failure to remove the same.

According to a seventh aspect of the present invention, in the sixth aspect of the invention, there is provided a metal clip for vehicle accessory fixation in which the end section of the second V-shaped tab protrudes in a direction away from the first V-shaped tab.

According to the aspect as described above, even in the case in which the metal clip is obliquely inserted into the installation hole of the vehicle panel, for example, it is possible to prevent the end section of the second V-shaped tab from getting out to the backside of the installation hole, thus making it possible, when the metal clip is necessitated to detach, to prevent the end section of the second V-shaped tab from engaging with the back side of the installation hole and avoiding failure to remove the same.

According to a eighth aspect of the present invention, there is provided a vehicle accessory installation structure. The structure includes: a vehicle panel including an installation hole; an interior member including a hole to align with the installation hole; a vehicle accessory to be fixed to the vehicle panel through the intermediation of the interior member; and a metal clip to be engaged with a base section of the vehicle accessory and inserted into the hole of the interior member and the installation hole of the vehicle panel and thereby to effect fixation of the vehicle accessory, in which the metal clip includes: a first V-shaped tab bent into a substantially V-shape as seen from a side, the first V-shaped tab including an installation section to engage with the base section of the accessory, wherein the installation section is formed at ending edge of each flap of the first V-shaped tab and including an engagement section to engage with the installation hole of the vehicle panel, wherein the engagement section is provided at halfway portion of each flap of the first V-shaped tab; an extension section extending in a direction along folding line from a valley bottom section of the first V-shaped tab; and a second V-shaped tab extending from both sides of the extension section in directions crossing the extension section and bent into a V-shape with the extension section as a valley bottom section, the second V-shaped tab including end sections thereof to engage with the hole of the interior member and thereby to effect temporary fixation of the accessory, and in which, once the first V-shaped tab and the second V-shaped tab are inserted into the hole of the interior member while the installation section of the metal clip engaging with the base section of the vehicle accessory thereby to temporarily fix the metal clip to the interior member, further, in this state, the first V-shaped tab and the second V-shaped tab are inserted into the installation hole of the vehicle panel such that the engagement section of the first V-shaped tab engages with the installation hole thereby to fix the vehicle accessory to the vehicle panel through the intermediation of the interior member.

According to the aspect as described above, solely by inserting the metal clip into the hole of the interior member and the hole of the vehicle panel, it is possible to fix the vehicle accessory reliably and with a simple operation to the installation hole through the intermediation of the interior member.

Effects Of The Invention

According to the present invention, there is provided a metal clip for vehicle accessory fixation to be mounted to a base section of a vehicle accessory and inserted into a hole of an interior member and thereby to effect temporary fixation of the accessory to the interior member, and to be inserted, in this state, into an installation hole of a vehicle panel and thereby to effect final fixation of the accessory to the vehicle panel. In the metal clip, it is possible to make its area in a developed state relatively small, thereby achieving an improvement in terms of the yield rate in a metal plate when stamping is performed thereon. Further, the distance from the second V-shaped tab to the first V-shaped tab is substantially determined by the shape attained at the time of stamping, so it is possible to prevent the position of the end section of the second V-shaped tab from being unreliable, which is otherwise varied depending upon the bending angle of the metal plate, thus making it possible to reliably effect the temporary fixation of the accessory to the interior member.

BRIEF DESCRIPTION OF THE DRAWINGS

FIG. 1 is an exploded perspective view showing how a metal clip for vehicle accessory fixation according to the present invention is assembled to a vehicle accessory.

FIG. 2 is a perspective view of the metal clip for vehicle accessory fixation as assembled to the vehicle accessory.

FIG. 3 are sectional views of components of the vehicle accessory, of which portion (a) shows a cap, and portion (b) shows a support rod and a base section.

FIG. 4 is an explanatory view of the metal clip for vehicle accessory fixation as developed in a plane.

FIG. 5 are diagrams showing the metal clip for vehicle accessory fixation, of which portion (a) is a front view, portion (b) is a side sectional view, and portion (c) is a bottom view.

FIG. 6 are diagrams showing how temporary fixation to an interior member is effected by using the metal clip for vehicle accessory fixation, of which portion (a) is a partial front sectional view, and portion (b) is a side sectional view.

FIG. 7 are diagrams showing how final fixation to a vehicle panel is effected by using the metal clip for vehicle accessory fixation, of which portion (a) is a partial front sectional view, and portion (b) is a side sectional view.

FIG. 8 is a perspective view of a metal clip for vehicle accessory fixation according to another embodiment of the present invention.

DESCRIPTION OF SYMBOLS

10 vehicle accessory
30, 30a metal clip
31 valley bottom section
32 folding line
33a proximal portion
33 first V-shaped tab
34 installation section
35 slit
36 elastically flexible member
36a engagement section
36b end section
37 extension section
38 second V-shaped tab
38a end section
39 space
50 interior member
51 hole
52 vehicle panel
53 installation hole

BEST MODE FOR CARRYING OUT THE INVENTION

Embodiments of the present invention will be described with reference to the drawings. FIGS. 1 through 7 show an embodiment of the present invention.

In FIG. 1, numeral 10 indicates a vehicle accessory, numeral 30 indicates metal clips for fixing the vehicle accessory 10 in position, and numeral 50 indicates an interior member.

In this embodiment, the vehicle accessory 10 is composed of a support rod 11 to which a sun visor (not shown) is mounted, a base section 12 rotatably supporting the support rod 11, and a cap 13 to be put on the base section 12.

Referring to both FIGS. 2 and 3, the proximal end portion of the support rod 11 is bent in an L-shape to form a shaft 11a, which is rotatably supported by the base section 12. A distal portion 11b thereof is inserted into the sun visor (not shown) to support the sun visor.

The base section 12 has at its center a bearing portion 12a into which the shaft 11a is inserted. After being inserted into the bearing portion 12a, the shaft 11a is rotatably supported while protected against detachment by an eyelet 14. At both sides of the bearing portion 12a, there are formed through-holes 15. The metal clips 30 described below are inserted into the through-holes 15 and attached thereto. Further, in a side wall at either end of the base section 12, there are formed a first engagement groove 16 and a second engagement groove 17 arranged side by side in the thickness direction.

The cap 13 has at its center a cutout-like opening 18, into which the support rod 11 is inserted. At the peripheral edge of the cap 13, there is formed a peripheral wall 19, which is formed so as to match with the peripheral edge of the base section 12.

At a pair of opposing positions on the peripheral wall 19, there are provided inwardly protruding engagement projections 20. The engagement projections 20 are to be engaged, with a tactile feel, with the first engagement grooves 16 as well as the second engagement grooves 17 of the base section 12 mentioned above.

At both sides of the opening 18, there protrude lock pins 21 to be inserted into the through-holes 15 of the base section 12. The pair of lock pins 21 are passed through the through-holes 15, and are forced into the metal clips 30 described below, serving to maintain the metal clips 30 in a widened state. The lock pin 21 has a tapered distal portion 21a and a proximal portion 21b enlarged in diameter.

As shown in FIGS. 4 and 5, each metal clip 30 has a first V-shaped tab 33 formed in a substantially V-shaped configuration by being bent at two folding lines 32 provided parallel to each other along a valley bottom section 31. Both end sections of the first V-shaped tab 33 constitute installation sections 34, which are formed by being bent outward in a flange-like fashion and are then bent upward at the distal ends thereof. When the metal clip 30 is inserted into one of the through-holes 15 of the base section 12, the installation sections 34 are engaged with the peripheral edge of the through-hole 15, thus serving to attach the metal clip 30 to the base section 12.

At the center of each flap of the first V-shaped tab 33, there is formed an elastically flexible member 36 by a U-shaped slit 35. The elastically flexible member 36 has an engagement section 36a formed by widening outward and then bending inward the same, and an end section 36b formed by bending outward its distal end again. The portion between the engagement section 36a and the end section 36b is formed as an inward projection 36c.

On both sides in the width direction of the valley bottom section 31 of the first V-shaped tab 33, there are provided extension sections 37 extending along the folding lines 32. A proximal portion 33a of each flap of the first V-shaped tab 33 is gradually reduced in width to connect to the extension sections 37. At each end in the length direction of the extension section 37, there is provided second V-shaped tab 38 extending in a width direction of the extension section 37 on the side thereof. The second V-shaped tab 38 is also bent at the folding lines 32 into a V-shape.

The second V-shaped tab 38 crosses the extension section 37, and extends obliquely away from the first V-shaped tab 33. A space 39 is formed between the first V-shaped tab 33 and the second V-shaped tab 38.

The configuration of the second V-shaped tab 38 will be described in more detail. The second V-shaped tab 38 is raised substantially at right angles with respect to the extension sections 37, and then extends in an arcuate shape while being curved outward. That is, the second V-shaped tab 38 is formed curvedly as an arcuate configuration such that its inclination angle with respect to a vertical plane perpendicular to the extension section 37 gradually increases toward the distal end. Further, end sections 38a of the second V-shaped tab 38 are configured so as to protrude in a direction away from the first V-shaped tab 33.

As shown in FIGS. 5(b) and 5(c), the bending angle at which the second V-shaped tab 38 is bent at the folding lines 32 is larger than the bending angle of the first V-shaped tab 33, with the result that the second V-shaped tab 38 is situated on the inner side of the first V-shaped tab 33.

In the case of this embodiment, the valley bottom section 31 and the extension sections 37 constitute a flat surface. At the two folding lines 32 provided on both sides of the flat surface, both the first V-shaped tab 33 and the second V-shaped tab 38 are bent to rise. However, with the valley bottom section 31 and the extension sections 37, they may constitute a configuration in which bending is effected at a single folding line or a configuration in which bending is effected in a curved, round shape. In the case of the above-mentioned round shape, the folding line in the present invention means a ridgeline that is connecting the distal ends of the bent portions.

As shown in FIG. 4, in the metal clip 30, the second V-shaped tab 38 extends so as to cross the extension sections 37 and is configured so as to widen on both sides of the first V-shaped tab 33. Thus, in the developed form, it is enclosed in a rectangle A with a relatively small width. This helps to achieve an improvement in terms of the yield rate when forming the metal clip through stamping of a metal plate.

As shown in FIG. 1, the interior member 50 has holes 51 into which the metal clips 30 are inserted. Each hole 51 is configured so as to engage with the second V-shaped tab 38 to effect temporary fixation. As shown in FIG. 7, an installation hole 53 is formed in a vehicle panel 52. The installation hole 53 is configured so as to allow insertion of each metal clip 30, which is inserted into the hole 51 of the interior member 50, such that the engagement sections 36a of the elastically flexible members 36 engage to effect final fixation.

Next, a method of installing the vehicle accessory 10 by using the metal clips 30 will be described. First, the metal clips 30 are inserted into the through-holes 15 of the base section 12 of the vehicle accessory 10 from the front side, and the installation sections 34 are engaged with the peripheral edges of the through-holes 15, thereby attaching to the base section 12.

In this state, the cap 13 is put on the base section 12, and a pair of lock pins 21 formed on the cap 13 is inserted into the pair of through-holes 15 of the base section 12. The lock pins 21 are inserted into the first V-shaped tabs 33 of the metal clips 30.

In the temporary fixation state, locking is effected through fit-engagement of the engagement projections 20 of the cap 13 with the first engagement grooves 16 of the base section 12. At this state, the lock pins 21 are inserted halfway through the first V-shaped tabs 33, which are not in a widened state. The metal clips 30 in this state are inserted into the holes 51 of the interior member 50 as shown in FIG. 6.

The second V-shaped tabs 38 of the metal clip 30 are pressurized by the inner periphery of the hole 51, and are deflected inward around the extension sections 37 and displaced to the inner side of the first V-shaped tab 33 so as to contract. At this state, the second V-shaped tabs 38 are raised from the extension sections 37 nearly at right angles with respect to the extension sections 37, and are curved so as to be obliquely inclined to a large degree as extending away from the extension sections 37, therefore the pressurizing force exerted due to the holes 51 becomes larger toward the distal ends of the second V-shaped tabs 38.

However, as departed from the extension sections 37, the force acting on the second V-shaped tabs 38 results in larger rotational moment and acts to bend the extension sections 37, therefore the insertion resistance at the hole 51 is not increased so much, making it possible for the second V-shaped tabs 38 to get out of the hole 51.

When they have thus got out of the hole 51, the second V-shaped tabs 38 are restored to the former outward widened configuration by the elastic restoring force, and the end sections 38a are engaged with the back-side peripheral edge of the hole 51 of the interior member 50, thereby temporarily fixing the vehicle accessory 10 to the interior member 50. Since the metal clip 30 has the developed configuration as shown in FIG. 4, a width W of the second V-shaped tabs 38 is determined by the stamping configuration, thus making it possible to improve the dimensional stability of the width W. As a result, when the metal clip are inserted into the hole 51 of the interior member 50, the second V-shaped tabs 38 can reliably engage with the back-side peripheral edge of the hole 51. Further, since the temporary fixation to the interior member 50 is possible with the metal clips 30 alone, there is no need to use a member such as a push-on fixer as in the case of Patent Document 3 mentioned above, thus making it possible to achieve an improvement in terms of workability.

After the vehicle accessory 10 has been thus temporarily fixed to the interior member 50, the interior member 50 is conveyed into the interior of a vehicle body, and fixed through the installation hole 53 of the vehicle panel 52 arranged on the inner surface of the vehicle body.

That is, as shown in FIG. 7, the distal end portion of each metal clip 30 protruding from each hole 51 of the interior member 50 is inserted into the installation hole 53 of the vehicle panel 52. At this state, each lock pin 21 has not been completely inserted into the metal clip 30, so the elastically flexible members 36 of the metal clip 30 are not in a widened state. Thus, the metal clip 30 can be inserted into the mounting hole 53 relatively smoothly.

On the other hand, the second V-shaped tabs 38 are pressurized by the inner periphery of the installation hole 53 and are bent inward around the extension sections 37 in a deflected state such that it enters the inner side of the first V-shaped tab 33 as inserted. However, the end sections 38a of the second V-shaped tabs 38, which protrude away from the first V-shaped tab 33, do not get out of the installation hole 53 but are retained in the installation hole 53 in a contracted state.

After the metal clip 30 is thus inserted into the installation hole 53 of the vehicle panel 52, the cap 13 is pushed firmly to force the lock pin 21 into the metal clip 30. Then, as shown in FIG. 7, the lock pin 21 is inserted deep into the space defined by the elastically flexible members 36 of the metal clip 30, and the proximal portion 21b of the lock pin 21 pressurizes the inward projections 36c of the elastically flexible members 36 to widen the same apart, causing the engagement sections 36a to engage with the back-side peripheral edge of the installation hole 53.

At this state, the engagement projections 20 of the cap 13 are fit-engaged with the second engagement grooves 17, retaining the lock pins 21 in a forced-in state. Since the second V-shaped tabs 38 of each metal clip 30 are retained in a contracted state within the installation hole 53, the second V-shaped tabs 38 give a function for centering of the metal clip 30. In this way, the vehicle accessory 10 can be finally fixed to the installation holes 53 of the vehicle panel 52 together with the interior member 50.

Further, the inward projections 36c of the elastically flexible members 36 of the first V-shaped tab 33 are curved in a U-shape, therefore, when the lock pin 21 is inserted as described above and the inward projections 36c are deformed outward, the curved outer side surfaces of the inward projections 36c abut the inner peripheral portion of the installation hole 53 elastically so as to be pressed against the same, then the metal clip 30 is fixed to the vehicle panel 52. It is thus possible to suppress rattling of the metal clips 30 even when the thickness of the vehicle panel 52 differs or when the size of the lock pins 21 varies, making it possible to reliably effect the final fixation of the vehicle accessory 10.

Next, the operation to be performed when there is a need to detach the finally fixed vehicle accessory 10 from the vehicle panel 52, for example, for the replacement of a component, will be described.

In this case, the cap 13 is pulled backward to shift the engagement projections 20 from the second engagement grooves 17 to the first engagement grooves 16. As a result, the lock pin 21 is pulled outward halfway through the space defined by the elastically flexible members 36 of the metal clip 30, and the distal end portion 21a of the lock pin 21 is lodged at the inner side of the elastically flexible members 36, so the configuration of the elastically flexible members 36 are restored inward to the former contracted state. Thus, by pulling the vehicle accessory 10, the metal clips 30 can be easily pulled out of the installation holes 53 of the vehicle panel 52. In this way, it is possible to re-establish the state in which the vehicle accessory 10 is temporarily fixed to the interior member 50. After that, the metal clips 30 are removed from the relatively soft interior member 55 through manual operation, thus making it possible to perform operations such as the replacement of a component.

FIG. 8 shows another embodiment of the vehicle accessory 10 of the present invention. Basically, a metal clip 30a according to this embodiment is of the same configuration and construction as the metal clip 30 of the above-mentioned embodiment.

This embodiment differs from the above-mentioned embodiment, in which the second V-shaped tab 38 is provided solely on one side of the first V-shaped tab 33. In this embodiment, the second V-shaped tab 38 is provided solely on one side of the first V-shaped tab 33 for use in a case, for example, when a pair of holes 51 provided in the interior member 50 shown in FIG. 1 be replaced by a single and continuous hole 51; in such a case, only the portion of the second V-shaped tab 38 of each metal clip 30 which is situated on the outer side thereof is engaged with the peripheral edge of the hole 51, while the portion of the second V-shaped tab 38 of each metal clip which is situated on the inner side thereof is not needed for the temporary fixation.

It is noted that, although the above-mentioned embodiment is applied to a fixing device for mounting the support rod, the base section, the cap, and the like of a sun visor, the present invention is not limited to the fixation of a sun visor and is applicable to the fixation of various other vehicle accessories such as an assist grip.

INDUSTRIAL APPLICABILITY

According to the present invention, there are provided a metal clip for vehicle accessory fixation allowing fixation of a vehicle accessory to a vehicle panel while achieving an improvement in terms of the yield rate in the requisite metal plate when forming the metal clip and reliably effecting temporary fixation of the accessory to the interior member, and a vehicle accessory installation structure using the same.

The invention claimed is:

1. A metal clip for vehicle accessory fixation to be mounted to a base section of a vehicle accessory and inserted into a hole of an interior member to thereby effect temporary fixation of the accessory to the interior member, and to be inserted, in this state, into an installation hole of a vehicle panel and thereby effect final fixation of the accessory to the vehicle panel, the metal clip comprising:

a first V-shaped tab having flaps bent into a substantially V-shape as seen from a side, the first V-shaped tab including an installation section to engage with the base section of the accessory, wherein the installation section is formed at an ending edge of each flap of the first V-shaped tab and including an engagement section to engage with the installation hole of the vehicle panel, wherein the engagement section is provided at a halfway portion of each flap of the first V-shaped tab;

an extension section having sides extending in a direction along a folding line from a valley bottom section of the first V-shaped tab; and a second V-shaped tab extending from both sides of the extension section in directions crossing the extension section and bent into a V-shape with the extension section as a valley bottom section, the second V-shaped tab including end sections thereof to engage with the hole of the interior member and thereby effect temporary fixation of the accessory.

2. A metal clip for vehicle accessory fixation according to claim 1, wherein each flap of the first V-shaped tab is connected to the extension section with the width of each flap reduced.

3. A metal clip for vehicle accessory fixation according to claim 1, wherein a bending angle of the valley bottom section of the second V-shaped tab is smaller than a bending angle of the valley bottom section of the first V-shaped tab; and whereby, when the second V-shaped tab is deflected so that the extension section bends, the second V-shaped tab enters an inner side of the first V-shaped tab.

4. A metal clip for vehicle accessory fixation according to claim 1, wherein the second V-shaped tab crosses the extension section and is formed to extend obliquely away from the first V-shaped tab.

5. A metal clip for vehicle accessory fixation according to claim 4, wherein the second V-shaped tab is formed curvedly so that the second V-shaped tab is largely inclined with respect to a vertical plane that is perpendicular to the extension section as the second V-shaped tab extends away from the extension section.

6. A metal clip for vehicle accessory fixation according to any one of claims 1 to 5, wherein the end sections of the second V-shaped tab are provided to abut an inner peripheral portion of the installation hole of the vehicle panel while the first V-shaped tab engages with the installation hole of the vehicle panel.

7. A metal clip for vehicle accessory fixation according to claim 6, wherein the end sections of the second V-shaped tab protrude in a direction away from the first V-shaped tab.

8. A vehicle accessory installation structure, the structure comprising:

a vehicle panel including an installation hole;

an interior member including a hole to align with the installation hole;

a vehicle accessory to be fixed to the vehicle panel through the intermediation of the interior member; and a metal clip to be engaged with a base section of the vehicle accessory and inserted into the hole of the interior member and the installation hole of the vehicle panel and to thereby effect fixation of the vehicle accessory, the metal clip comprising:

a first V-shaped tab having flaps bent into a substantially V-shape as seen from a side, the first V-shaped tab including an installation section to engage with the base section of the accessory, wherein the installation section is formed at an ending edge of each flap of the first V-shaped tab and including an engagement section to engage with the installation hole of the vehicle panel, wherein the engagement section is provided at a halfway portion of each flap of the first V-shaped tab;

an extension section having sides extending in a direction along a folding line from a valley bottom section of the first V-shaped tab; and a second V-shaped tab extending from both sides of the extension section in directions crossing the extension section and bent into a V-shape with the extension section as a valley bottom section, the second V-shaped tab including end sections thereof to engage with the hole of the interior member and thereby effect temporary fixation of the accessory, wherein, once the first V-shaped tab and the second V-shaped tab are inserted into the hole of the interior member while the installation section of the metal clip engages the base section of the vehicle accessory to thereby temporarily fix the metal clip to the interior member, the first V-shaped tab and the second V-shaped tab are inserted into the installation hole of the vehicle panel such that the engagement section of the first V-shaped tab engages with the installation hole to thereby fix the vehicle accessory to the vehicle panel through the intermediation of the interior member.

* * * * *